US010229686B2

(12) United States Patent
Buck et al.

(10) Patent No.: US 10,229,686 B2
(45) Date of Patent: Mar. 12, 2019

(54) METHODS AND APPARATUS FOR SPEECH SEGMENTATION USING MULTIPLE METADATA

(71) Applicant: NUANCE COMMUNICATIONS, INC., Burlington, MA (US)

(72) Inventors: Markus Buck, Biberach (DE); Tobias Herbig, Ulm (DE); Simon Graf, Ulm (DE); Christophe Ris, Taintignies (BE)

(73) Assignee: NUANCE COMMUNICATIONS, INC., Burlington, MA (US)

( * ) Notice: Subject to any disclaimer, the term of this patent is extended or adjusted under 35 U.S.C. 154(b) by 5 days.

(21) Appl. No.: 15/329,354

(22) PCT Filed: Aug. 18, 2014

(86) PCT No.: PCT/US2014/051457
§ 371 (c)(1),
(2) Date: Jan. 26, 2017

(87) PCT Pub. No.: WO2016/028254
PCT Pub. Date: Feb. 25, 2016

(65) Prior Publication Data
US 2017/0213556 A1    Jul. 27, 2017

(51) Int. Cl.
*G10L 15/28*    (2013.01)
*G10L 15/22*    (2006.01)
(Continued)

(52) U.S. Cl.
CPC ............ *G10L 15/28* (2013.01); *G10L 15/04* (2013.01); *G10L 15/22* (2013.01); *G10L 25/78* (2013.01); *G10L 15/20* (2013.01); *G10L 21/02* (2013.01)

(58) Field of Classification Search
CPC ...................................................... G10L 15/04
(Continued)

(56) References Cited

U.S. PATENT DOCUMENTS 5,826,230 A * 10/1998 Reaves .................. G10L 25/78
704/233
6,185,527 B1    2/2001 Petkovic et al.
(Continued)

FOREIGN PATENT DOCUMENTS

JP    2009-216986 A    9/2009

OTHER PUBLICATIONS

PCT International Preliminary Report and Written Opinion dated Mar. 2, 2017 for International Application No. PCT/US2014/051457; 8 Pages.
(Continued)

*Primary Examiner* — Paras D Shah
*Assistant Examiner* — Oluwadamilola M Ogunbiyi
(74) *Attorney, Agent, or Firm* — Daly, Crowley, Mofford & Durkee LLP

(57) ABSTRACT

Methods and apparatus to process microphone signals by a speech enhancement module to generate an audio stream signal including first and second metadata for use by a speech recognition module. In an embodiment, speech recognition is performed using endpointing information including transitioning from a silence state to a maybe speech state, in which data is buffered, based on the first metadata and transitioning to a speech state, in which speech recognition is performed, based upon the second metadata.

21 Claims, 6 Drawing Sheets

(51) Int. Cl.
*G10L 25/78* (2013.01)
*G10L 15/04* (2013.01)
*G10L 15/20* (2006.01)
*G10L 21/02* (2013.01)

(58) Field of Classification Search
USPC ........................................................ 704/208
See application file for complete search history.

(56) References Cited

U.S. PATENT DOCUMENTS

| | | | |
|---|---|---|---|
| 6,907,030 B1* | 6/2005 | Bladsjo | H04L 1/0001 370/349 |
| 8,442,817 B2* | 5/2013 | Naka | G10L 25/78 704/207 |
| 2003/0039338 A1* | 2/2003 | Erb | H04M 3/42204 379/88.01 |
| 2005/0114118 A1* | 5/2005 | Peck | G10L 25/87 704/208 |
| 2005/0141541 A1* | 6/2005 | Cuny | H04L 65/4061 370/437 |
| 2005/0154583 A1* | 7/2005 | Naka | G10L 25/78 704/217 |
| 2005/0216261 A1* | 9/2005 | Garner | G10L 25/87 704/215 |
| 2006/0122837 A1 | 6/2006 | Kim et al. | |
| 2007/0050190 A1* | 3/2007 | Washio | G10L 15/22 704/249 |
| 2007/0294295 A1* | 12/2007 | Finkelstein | G06F 17/30017 |
| 2009/0052636 A1 | 2/2009 | Webb et al. | |
| 2010/0185448 A1* | 7/2010 | Meisel | G10L 15/22 704/256.1 |
| 2010/0191524 A1* | 7/2010 | Washio | G10L 25/78 704/207 |
| 2011/0055256 A1* | 3/2011 | Phillips | G10L 15/30 707/769 |
| 2011/0208520 A1* | 8/2011 | Lee | G10L 25/78 704/233 |
| 2012/0065972 A1* | 3/2012 | Strifler | G10L 15/26 704/246 |
| 2012/0253799 A1 | 10/2012 | Bangalore et al. | |
| 2012/0330653 A1* | 12/2012 | Lissek | H04M 1/035 704/226 |
| 2013/0211826 A1* | 8/2013 | Mannby | G10L 19/00 704/201 |
| 2014/0278391 A1* | 9/2014 | Braho | G10L 15/20 704/233 |
| 2015/0172454 A1* | 6/2015 | Milosevski | H04W 4/027 455/419 |
| 2015/0302855 A1* | 10/2015 | Kim | G10L 17/22 704/275 |

OTHER PUBLICATIONS

PCT Search Report and Written Opinion of ISA dated Apr. 28, 2015; for PCT App. No. PCT/US2014/051457; 11 pages.
Moattar et al.; "A Simple but Efficient Real-Time Voice Activity Detection Algorithm"; 17th European Signal Processing Conference, Aug. 24-28, 2009; pp. 2549-2553 (5 pages).
Ma et al.; "Efficient voice activity detection algorithm using long-term spectral flatness measure"; EURASIP Journal on Audio, Speech, and Music Processing, Jan. 21, 2013; 18 pages.

* cited by examiner

METHODS AND APPARATUS FOR SPEECH SEGMENTATION USING MULTIPLE METADATA

CROSS REFERENCE TO RELATED APPLICATIONS

This application is a National Stage application of PCT/2014/051457 filed on Aug. 18, 2014, and entitled "METHODS AND APPARATUS FOR SPEECH SEGMENTATION USING MULTIPLE METADATA", which is incorporated herein by reference.

BACKGROUND

In some speech processing systems, speech enhancement (SE) and automated speech recognition (ASR) are realized by separate engines. A SE module sends an enhanced single channel audio signal as well as some metadata to an ASR module. The original multi-channel recordings (e.g. originating from a microphone array) contain information that may be useful for speech detection, such as spatial information that enables distinguishing a target speaker from interfering speakers and/or knowledge about a reference signal, which can be useful in echo cancellation. In known systems this data is only available to the speech enhancement module where it is condensed into a stream of metadata that is sent in parallel to the enhanced single-channel signal.

SUMMARY

Embodiments of the invention provide method and apparatus for a speech enhancement system having speech segmentation using metadata. In adverse acoustic environments, speech recognition should remain robust against interfering speakers or echoes from loudspeakers. In embodiments of the invention metadata from multiple speech detectors allows a compromise between the aggressiveness of speech enhancement, which might be counterproductive for speech recognition accuracy, and false triggering of the recognizer, which may result in high error rates. The ASR engine consolidates the metadata with its internal detectors for speech segmentation.

Conventional systems that include SE and ASR may have certain processing bottlenecks in ASR speech segmentation. For example, time-spatial information is summarized by the SE module to one value that is generated on a frame-by-frame base with limited history and without any look-ahead. The speech recognizer, however, processes the audio data on different time scales, e.g. by buffering the audio data until speech activity is detected. Fast detection is required to start buffering the audio stream in order not to miss speech onsets. After speech activity is detected with reasonable certainty, the speech recognition is triggered. These two effects—different time scales and contradicting requirements on the detection—are currently not reflected when generating the metadata. In known systems, the metadata is not updated by the SE module while the input stream is buffered in the ASR module. In addition, in conventional systems, the ASR engine has no knowledge about the internal state of the SE module, and therefore, cannot evaluate the confidence of the metadata. Further, in currently available systems, only the result of one detector is encoded, e.g. either based on the echo canceller or the beam former.

In embodiments of the invention, metadata for speech segmentation is generated by multiple speech detectors and takes into account the different requirements of ASR regarding latency and confidence of detection. Speech detectors adjusted to the particular tasks can send their metadata in parallel. It is understood that embodiments of the invention are applicable to any speech processing system in which speech segmentation is desirable.

In one aspect of the invention, a method comprises: processing microphone signals by a speech enhancement module to generate an audio stream signal; processing of the microphone signals by a first speech detector to generate first metadata; processing of the microphone signals by a second speech detector to generate second metadata; performing endpointing of the audio stream signal using the first and second metadata; and performing speech recognition on the audio stream signal using the endpointing including transitioning from a silence state to a maybe speech state, in which data is buffered, based on the first metadata and transitioning to a speech state, in which speech recognition is performed, based upon the second metadata.

The method can further include one or more of the following features: the first metadata has a frame-by-frame time scale, the second metadata has a sequence of frames time scale, performing one or more of barge-in, beamforming, and/or echo cancellation for generating the first and/or second metadata, tuning the parameters of the first speech detector (e.g., a speech detection threshold) for a given latency for the first metadata, adjusting latency for a given confidence level of voice activity detection for the second metadata, controlling computation of the second metadata using the first metadata (and vice-versa), and/or performing one or more of barge-in, beamforming, and/or echo cancellation for generating further metadata.

In another aspect of the invention, an article comprises: a non-transitory computer readable medium having stored instructions that enable a machine to: process microphone signals by a speech enhancement module to generate an audio stream signal; process of the microphone signals by a first speech detector to generate first metadata; processing of the microphone signals by a second speech detector to generate second metadata; perform endpointing of the audio stream signal using the first and second metadata; and perform speech recognition on the audio stream signal using the endpointing including transitioning from a silence state to a maybe speech state, in which data is buffered, based on the first metadata and transitioning to a speech state, in which speech recognition is performed, based upon the second metadata.

The article can further include one or more of the following features: the first metadata has a frame-by-frame time scale, the second metadata has a sequence of frames time scale, instructions to perform one or more of barge-in, beamforming, and/or echo cancellation for generating the first and second metadata, instructions to tune the parameters of the first detector for a given latency for the first metadata, instructions to adjust latency for a given confidence level of voice activity detection for the second metadata, instructions to control computation of the second metadata using the first metadata (and vice-versa), and/or instructions to perform one or more of barge-in, beamforming, and/or echo cancellation for generating further metadata.

In a further aspect of the invention, a system comprises: a speech enhancement module to process microphone signals for generating an audio stream signal, the speech enhancement module comprising: a first speech detector to process for generating first metadata; and a second speech detector to process the microphone signals for generating second metadata; and an automated speech recognition module to receive the audio stream from the speech enhancement module, the speech recognition module comprising: an endpointing module to perform endpointing of the audio stream signal using the first and second metadata; and a speech recognition module to perform speech recognition on the audio stream signal using the endpointing including transitioning from a silence state to a maybe speech state, in which data is buffered, based on the first metadata and transitioning to a speech state, in which speech recognition is performed, based upon the second metadata.

The system can further include a further speech detector to perform one or more of barge-in, beamforming, and/or echo cancellation for generating further metadata for use by the endpointing module, the first speech detector is further configured to tune the detector parameters (e.g., the detection threshold) for a given latency for the first metadata, and/or the second speech detector is further configured to adjust latency for a given confidence level of voice activity detection for the second metadata.

BRIEF DESCRIPTION OF THE DRAWINGS

The foregoing features of this invention, as well as the invention itself, may be more fully understood from the following description of the drawings in which.

DETAILED DESCRIPTION

Figure 1:
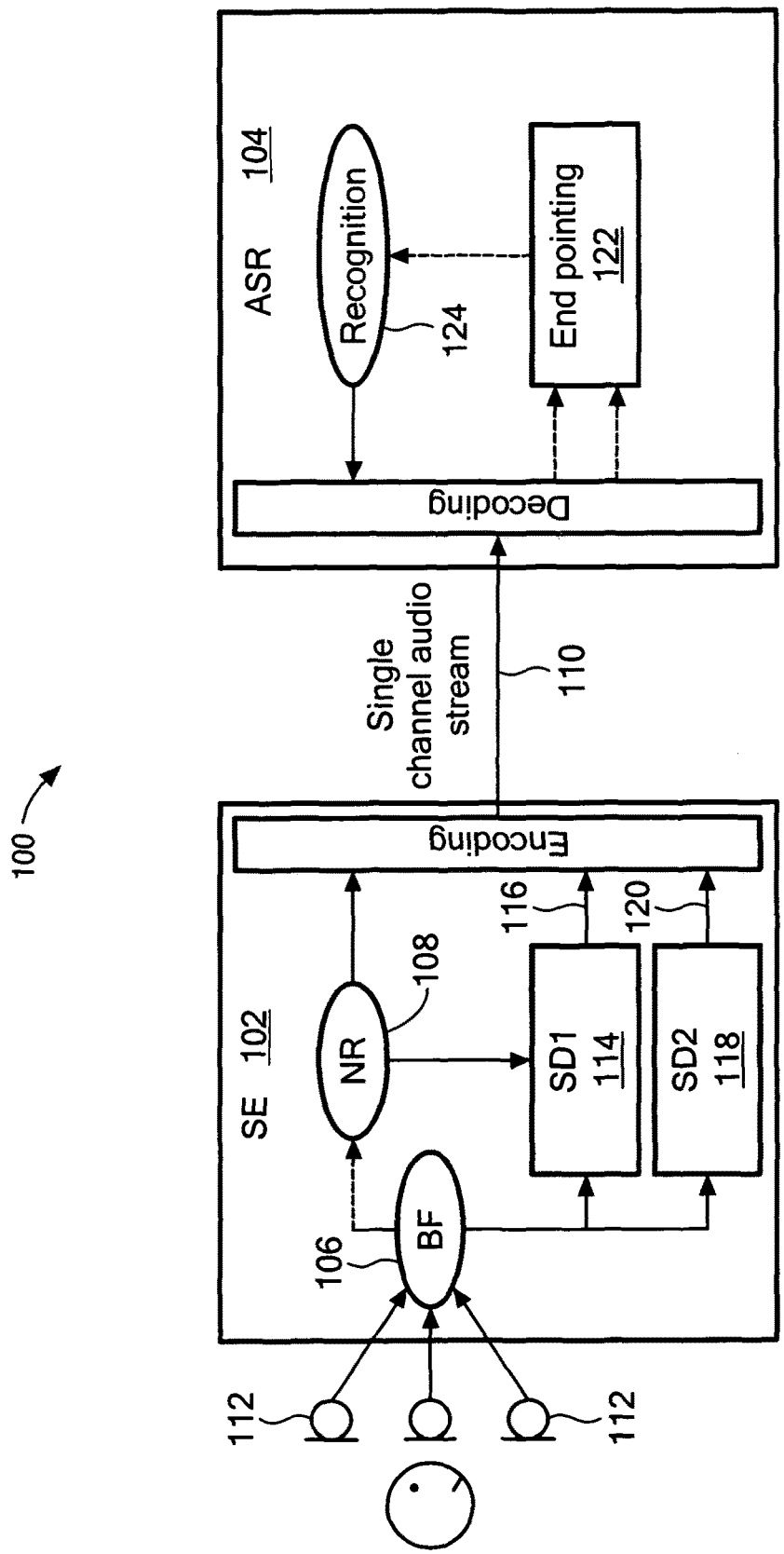
FIG. 1 is a schematic representation of an illustrative speech processing system having multiple metadata for speech recognition.

FIG. 1 shows an illustrative communication system 100 including a speech enhancement (SE) system 102 coupled to a speech recognition module 104, such as an automatic speech recognition (ASR) module. In an embodiment, the speech signal enhancement system 102 includes a beamformer module 106 and a noise reduction (NR) module 108 to generate an audio stream 110 from signals received from a series of microphones 112. The speech enhancement system 102 includes a first speech detector 114 to generate first metadata 116 and a second speech detector 118 to generate second metadata 120. The speech recognition system 104 includes an endpointing module 122 that uses the first and second metadata 116, 120 to provide information to a speech recognition module 124, which receives the audio stream, as described more fully below.

It is understood that the speech enhancement system 102 can include a variety of modules to process information from the microphones 112. Illustrative modules can include echo cancellation, beamforming, noise suppression, wind noise suppression, transient removal, and the like. It is further understood that additional speech detectors can be focused on one or more of echo cancellation, beamforming, noise suppression, wind noise suppression, transient removal, and the like, to generate further metadata that can be used by the endpointing module 122.

In embodiments of the invention, the speech detectors can be synchronous or asynchronous for extracting complementary information from the multi-channel audio stream to compromise latency and confidence of endpointing states for speech recognition, as described more fully below. In addition, while first and second speech detectors are shown in illustrative embodiments, it is understood that any practical number of speech detectors for generating respective metadata using various parameters can be used to meet the needs of a particular application.

Figure 2:
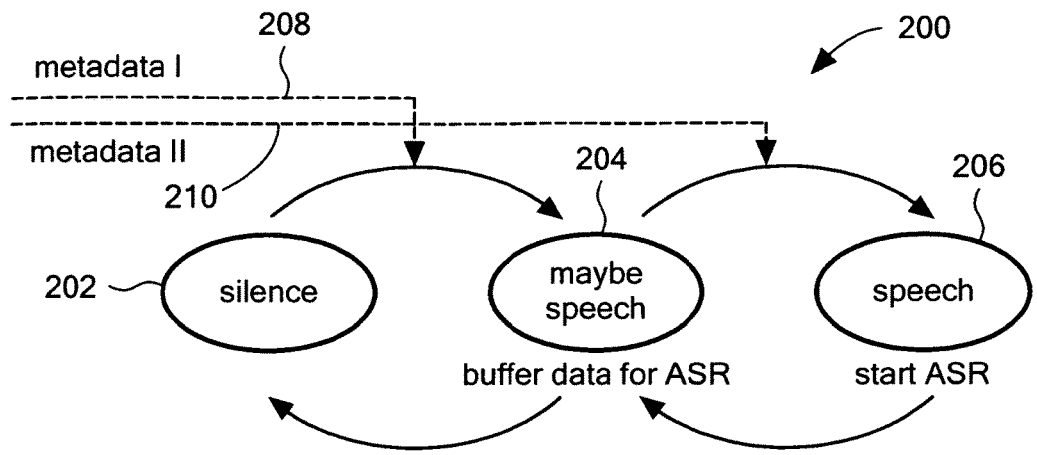
FIG. 2 is a state diagram for processing speech using multiple metadata.

FIG. 2 shows a state transition diagram 200 for endpointing in accordance with illustrative embodiments of the invention. The diagram includes a silence state 202, a maybe speech state 204, and a speech confirmed state 206. First and second metadata 208, 210 are used to transition between states. A transition from the silence state 202 to the maybe speech state 204 initiates buffering of audio data. Since a rapid reaction to speech onset is desired, low latency is required to minimize the miss rate of speech onsets, where lower confidence leading to higher false alarm rates may be acceptable.

A transition from the maybe state 204 to the speech confirmed state 206 triggers speech recognition. High confidence in the endpointing is desired to achieve high detection rates for speech activity and to avoid false triggers (false alarms) of the speech recognizer in case of non-stationary noise. Latency is not such an issue in this context and may be controlled by the metadata generated by the speech detectors in the speech enhancement module.

Figure 2A:
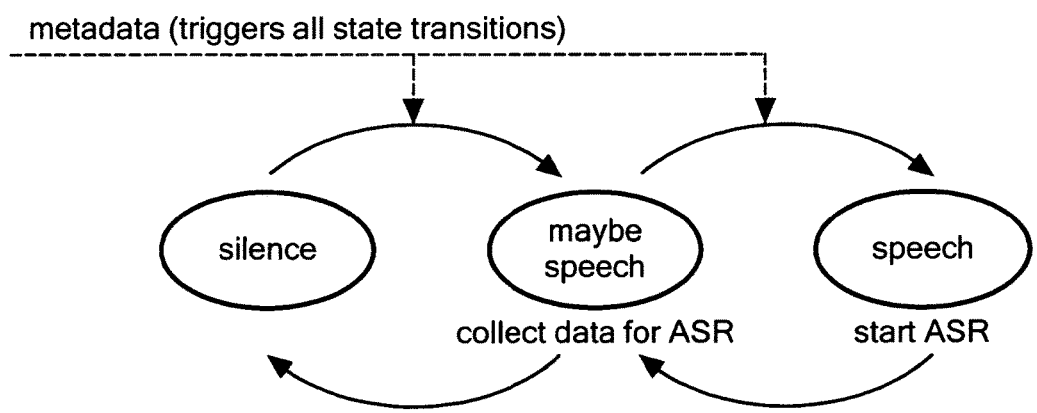
FIG. 2A is a prior art diagram for processing speech.

FIG. 2A shows a prior art system in which a single metadata triggers all state transitions from silence, to maybe speech, to confirmed speech. As can be seen, since a single metadata signal is generated the ability to compromise latency and confidence of speech activity is limited.

In general, the contradicting requirements for the state transitions are considered by employing multiple detectors to generate the first and second metadata. It is understood that the metadata from the speech detectors can be generated using a variety of factors. Speech models based on a single frame of the microphone signal may be evaluated to obtain a first speech detector with low latency. The speech detector may be tuned to achieve a low miss rate of speech onsets whereas the false alarm rate should not exceed a predefined value, for example. The confidence of a voice activity detection based on such a speech detector may be limited due to the short temporal context. Another speech detector may rely on more sophisticated speech models based on a larger temporal context. Such a detector can be tuned to yield lower false alarm rates than the first detector. Additional latency of the voice activity detection would be expected for more sophisticated processing. In general, the confidence of early decisions is limited by a given latency. If the latency can be adapted dynamically, a certain confidence level of speech detection can be achieved.

Different detectors may be employed for special use cases, e.g. barge-in, beamforming or distributed microphones. Instead of using one source of information, the results of several detectors can be weighted by some prior probabilities, normalized confidence measures and/or heuristic rules to calculate the metadata. A confidence measure may be based on the detection of speech onsets, specific group of phonemes (e.g. voiced speech) or noise scenarios (e.g. babble noise). Voiced speech typically has a more distinct characteristic compared to unvoiced speech. Challenging noise scenarios generally degrade the confidence of speech detection. In the case of babble noise, the background noise can comprise a superposition of several non-target speakers and therefore may exhibit speech-like characteristics. In addition, the internal state of the SE module may be incorporated into the confidence measure of the metadata. For example, the metadata may be not reliable when an echo canceller in the SE module has been reinitialized while the ASR module has already buffered audio data. The metadata may be rejected or confirmed by the ASR endpointing 122 (FIG. 1) prior to the transition from the maybe speech state 204 (FIG. 2) to the speech confirmed state 206. The use of multiple detectors on different asynchronous time scales yields significantly improved results compared to the frame-by-frame bases of conventional systems.

It is understood that different detectors can extract different types of information that can be based on multi-channel and single-channel microphone data. For example, a beamformer takes spatial information into account to detect target speakers based on the direction of arrival of the sound signal. For barge-in, since a reference signal is available, an adaptive filter can be calculated to estimate the underlying impulse response of the echo path. This estimate allows one to distinguish between speech of the local speaker and echo of the prompt played back over the loudspeaker. As mentioned above, the internal state directly after a reset of the echo canceller cannot be relied upon. Further distributed microphones can use speaker dedicated microphones. Further, multi-channel noise reduction can be used, as well as detectors for speech onsets and voiced speech. Background noise classification can also be implemented for single-channel data. Speech and noise characteristics may be evaluated at all processing stages including the unprocessed microphone signal and the enhanced output signal. In case of sample rate conversion both the fullband signal and/or the downsampled speech signal can be evaluated.

It is understood that the first and second metadata can be sent to the speech recognition module in a variety of formats. For example, the data can be sent within the audio stream as attached metadata in an extended data structure. That is, the speech enhancement module sends additional bytes attached to the audio signal buffers/frames. In another embodiment, the metadata is encoded into the audio stream data structure and decoded by the ASR module, as illustrated in FIG. 1. In one embodiment, encoding is realized in a frame-based manner, i.e. for each audio signal frame that is transmitted with the audio stream the complete set of meta data is encoded which is corresponding to this signal frame.

In embodiments, speech enhancement can be applied to audio and video data acquisition, such as face tracking and lip reading to improve speech segmentation. For example, video data can be helpful in determining whether there is a person in a room and who is the speaker. PCT Publication No. WO2013058728 A1, which is incorporated herein, discloses using visual information to alter or set operating parameters of an audio signal processor. For example, a digital camera can captures visual information about a scene that includes a human speaker and/or a listener to ascertain information about acoustics of a room.

Figure 3:
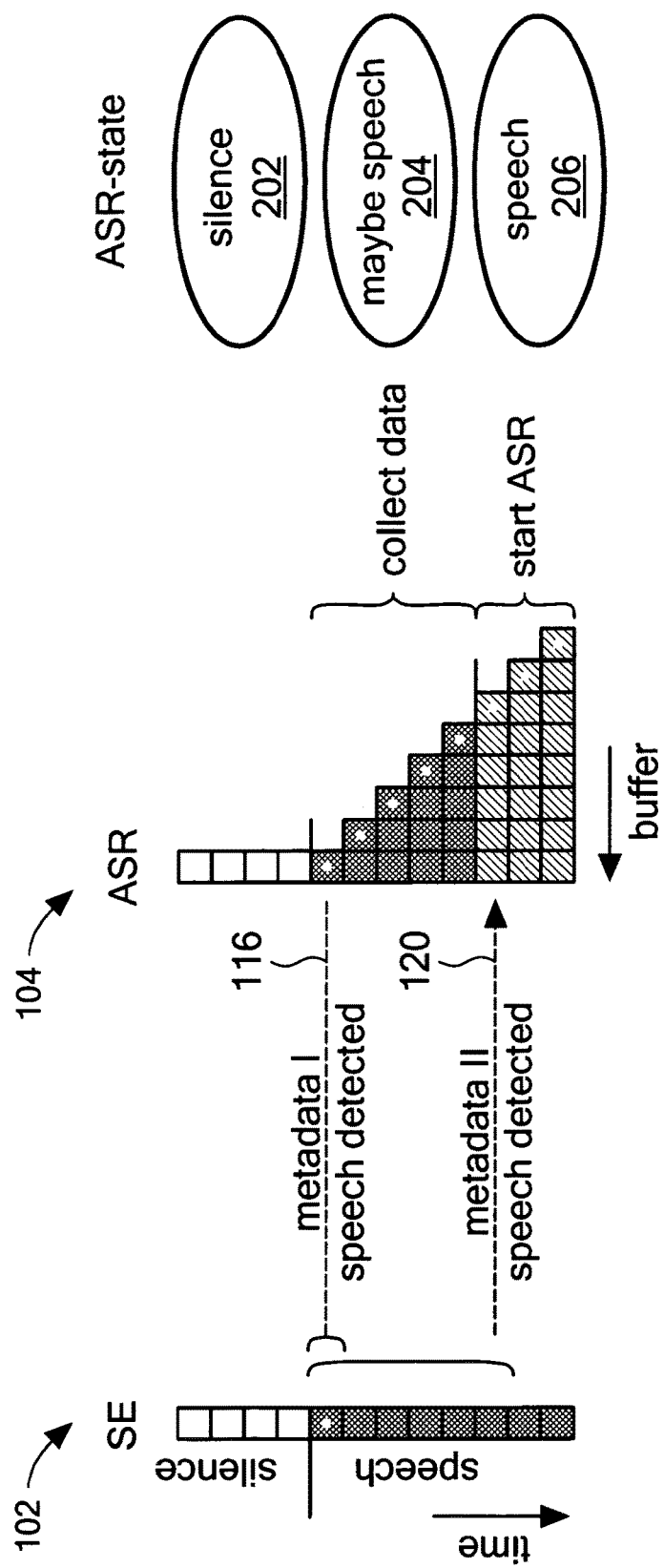
FIG. 3 is a schematic representation showing buffering and speech recognition based on multiple metadata.

FIG. 3, in conjunction with FIGS. 1 and 2, show an illustrative relationship between the first and second metadata 116, 120 generated by the speech enhancement module 102 to initiate buffering and speech recognition processing in the automatic speech recognition module 104. During the silent state 202, no speech is detected. During the maybe speech state 204, to which a transition occurs in response to possible speech detection in the first speech detector 114, data buffering is initiated in the ASR module 104. During the confirmed speech state 206, speech recognition is initiated by the ASR module 104 on the buffered data.

In one embodiment, the multi-channel input to the speech enhancement module 102 contains time-spatial information, e.g., about target/non-target speakers or reference signal in case of echo cancellation. If the ASR module 104 only receives single-channel data, as in conventional systems, it may react sensitively to aggressive speech enhancement. In accordance with embodiments of the invention, the multiple metadata allows a trade-off between the aggressiveness of signal processing and false triggering of the speech recognizer. In addition, the system can combine signal processing and some metadata for speech segmentation to achieve higher speech recognition accuracy.

It is understood that a variety of factors and configurations can be used to generate the multiple metadata. It is further understood that more than two metadata can be used to meet the needs of a particular application. A first metadata can provide low or no latency (on a frame basis) and a relatively low miss rate and a second metadata can provide high confidence and a high detection rate for a sequence of frames. For the first metadata, for a given latency, the detection/confidence threshold can be tuned with respect to the detection of speech onsets. For the second metadata, latency can be enlarged to achieve a certain confidence level for the start of speech recognition. In one embodiment, the calculation of the second metadata can be controlled by the first metadata. It is understood that the metadata can be tuned for illustrative applications including barge-in (loudspeaker reference channel for AEC (acoustic echo cancellation) is available), beam forming (microphone array), distributed microphones (dedicated microphones for multiple speakers), and the like. For example, in case of echo cancellation, one could use a standard VAD (voice activity detection) feature until the echo canceler has been converged after which the internal parameters of the echo canceler can be evaluated for the second metadata.

Figure 4:
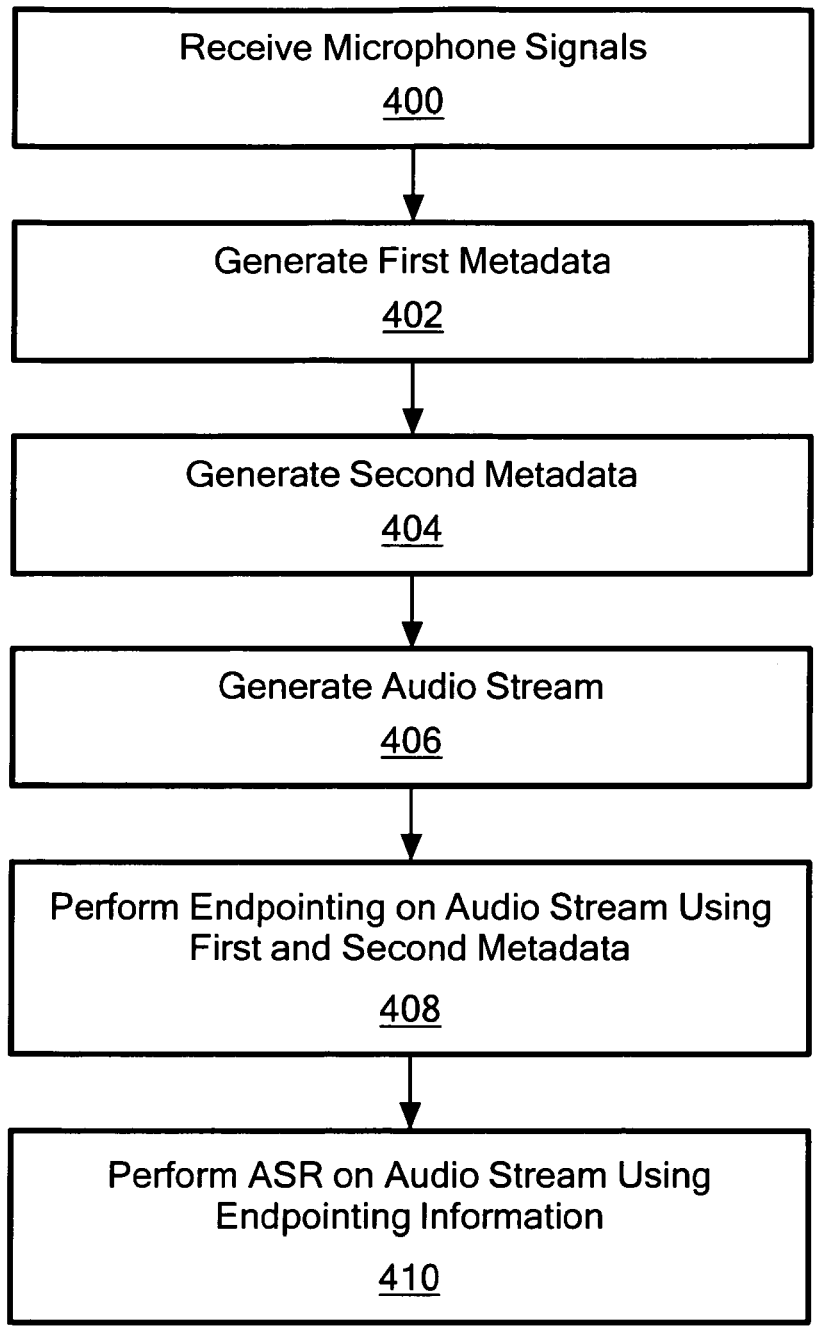
FIG. 4 is a flow diagram showing an illustrative sequence of steps for processing speech with multiple metadata.

FIG. 4 shows an illustrative sequence of steps for providing multiple metadata for speech segmentation. In step 400, signals are received from at least one microphone, such as a microphone array that is well-suited to detect speech. In step 402, a first speech detector generates first metadata and in step 404 a second speech detector generates second metadata. In step 406, a speech enhancement module generates an audio stream that includes processed microphone signal data and the first and second metadata. The metadata can be added to the audio stream and/or encoded by the speech enhancement module. In step 408, a speech recognition system receives the audio stream and performs endpointing on the microphone signals using the first and second metadata. In step 410, a speech recognition module performs speech recognition on the microphone signal data using information from the endpointing module.

Figure 4A:
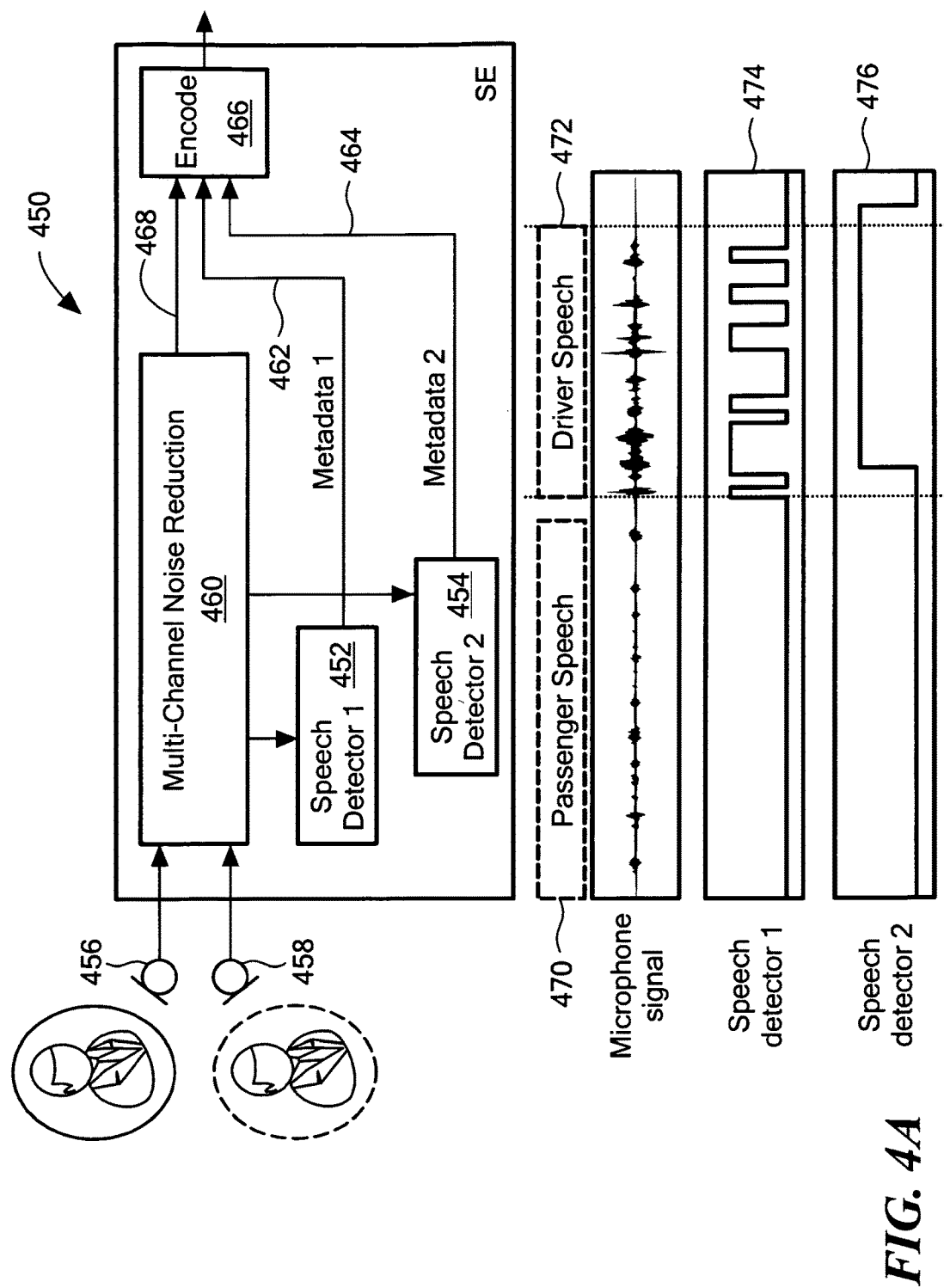
FIG. 4A is a schematic representation of a system having multiple speech detectors for distributed microphones and multi-channel noise reduction.

FIG. 4A shows a system 450 having first and second speech detectors 452, 454 for distributed microphones 456, 458, and a multi-channel noise reduction module 460. In the illustrated embodiment, in a system configured for a vehicle the first microphone 456 is adapted as dedicated driver microphone and the second microphone 458 is adapted as a passenger dedicated microphone. The first speech detector 452 generates first metadata 462 and the second speech detector 454 generates second metadata 464. An encoder 466 can encode the output 468 of the multi-channel noise reduction module 460 and the first and second metadata 462, 464 for decoding by an ASR module (not shown).

For passenger speech 470 and driver speech 472, a respective microphone signal is shown along with the first metadata 474 from the first speech detector 452 and the second metadata 476 for the second speech detector 454.

It is understood that a variety of suitable speech/voice activity detectors can be used to meet the requirements of a particular application. In one embodiment, a first speech detector to generate first metadata can be provided in accordance with "Spectral flatness": M. H. Moattar and M. M. Homayounpour, "A simple but efficient real-time voice activity detection algorithm," 17th European Signal Processing Conference (EUSIPCO 2009), 2009, which is incorporated herein by reference and a second speech detector to generate second metadata can be provided in accordance with "Long-term spectral flatness": Y. Ma and A. Nishihara, "Efficient voice activity detection algorithm using long-term spectral flatness measure," EURASIP Journal on Audio, Speech, and Music Processing, vol. 2013:21, no. 1, pp. 1-18, 2013, which is incorporated herein by reference.

One particular speech detector for a distributed microphone setup that is useful in providing metadata for embodiments of the invention is described below and disclosed in T. Matheja, M. Buck, and T. Fingscheidt "Speaker Activity Detection for Distributed Microphone Systems in Cars," Proc. of the 6th Biennial Workshop on Digital Signal Processing for In-Vehicle Systems, September, 2013, which is incorporated herein by reference.

In exemplary embodiments, an energy-based speaker activity detection (SAD) system evaluates a signal power ratio (SPR) in each of M≥2 microphone channels. In embodiments, the processing is performed in the discrete Fourier transform domain with the frame index l and the frequency subband index k at a sampling rate of $f_s=16$ kHz, for example. In one particular embodiment, the time domain signal is segmented by a Hann window with a frame length of K=512 samples and a frame shift of 25%. It is understood that basic fullband SAD is the focus here and that enhanced fullband SAD and frequency selective SAD are not discussed herein.

Using the microphone signal spectra Y(l,k), the power ratio $\widetilde{SPR}(l,k)$ and the signal-to-noise ratio (SNR) $\hat{\xi}_m(l,k)$ are computed to determine a basic fullband speaker activity detection $\widetilde{SAD}(l)$. As described more fully below, in one embodiment different speakers can be distinguished by analyzing how many positive and negative values occur for the logarithmic SPR in each frame for each channel m, for example.

Before considering the SAD, the system should determine SPRs. Assuming that speech and noise components are uncorrelated and that the microphone signal spectra are a superposition of speech and noise components, the speech signal power spectral density (PSD) estimate $\hat{\Phi}_{SS,m}(l,k)$ in channel m can be determined by $$\hat{\Phi}_{SS,m}(l,k)=\max\{\hat{\Phi}_{YY,m}(l,k)-\hat{\Phi}_{NN,m}(l,k),0\}, \quad (1)$$

where $\hat{\Phi}_{YY,m}(l,k)$ may be estimated by temporal smoothing of the squared magnitude of the microphone signal spectra $Y_m(l,k)$. The noise PSD estimate $\hat{\Phi}_{NN,m}(l,k)$ can be determined by any suitable approach such as an improved minimum controlled recursive averaging approach described in I. Cohen, "Noise Spectrum Estimation in Adverse Environments: Improved Minima Controlled Recursive Averaging," *IEEE Transactions on Speech and Audio Processing*, vol. 11, no. 5, pp. 466-475, September 2003, which is incorporated herein by reference. Note that within the measure in Equation (1), direct speech components originating from the speaker related to the considered microphone are included, as well as cross-talk components from other sources and speakers. The SPR in each channel m can be expressed below for a system with M≥2 microphones as $$\widetilde{SPR}_m(l,k) = \frac{\max\{\hat{\Phi}_{SS,m}(l,k), \epsilon\}}{\max\{\max_{\substack{m' \in \{1 \ldots M\} \\ m' \neq m}}\{\hat{\Phi}_{SS,m'}(l,k)\}, \epsilon\}} \quad (2)$$

with the small value $\epsilon$, as discussed similarly in T. Matheja, M. Buck, T. Wolff, "Enhanced Speaker Activity Detection for Distributed Microphones by Exploitation of Signal Power Ratio Patterns," in *Proc. IEEE International Conference on Acoustics, Speech, and Signal Processing (ICASSP)*, pp. 2501-2504, Kyoto, Japan, March 2012, which is incorporated herein by reference.

It is assumed that one microphone always captures the speech best because each speaker has a dedicated microphone close to the speaker's position. Thus, the active speaker can be identified by evaluating the SPR values among the available microphones. Furthermore, the logarithmic SPR quantity enhances differences for lower values and results in $$\widetilde{SPR}'_m(l,k)=10\log_{10}\widetilde{SPR}_m(l,k)) \quad (3)$$

Speech activity in the m-th speaker related microphone channel can be detected by evaluating if the occurring logarithmic SPR is larger than 0 dB, in one embodiment. To avoid considering the SPR during periods where the SNR $\hat{\xi}_m(l,k)$ shows only small values lower than a threshold $\Theta_{SNR1}$, a modified quantity for the logarithmic power ratio in Equation (3) is defined by $$\widetilde{SPR}_m(l,k) = \begin{cases} \widetilde{SPR}'_m(l,k), & \text{if } \hat{\xi}_m(l,k) \geq \Theta_{SNR}, \\ 0, & \text{else.} \end{cases} \quad (4)$$

With a noise estimate $\hat{\Phi}'_{NN,m}(l,k)$ for determination of a reliable SNR quantity, the SNR is determined in a suitable manner as in Equation (5) below, such as that disclosed by R. Martin, "An Efficient Algorithm to Estimate the Instantaneous SNR of Speech Signals," in *Proc. European Conference on Speech Communication and Technology (EUROSPEECH)*, Berlin, Germany, pp. 1093-1096, September 1993.

$$\hat{\xi}_m(l,k)=$$

$$\hat{\xi}_m(l,k) = \frac{\min\{\hat{\Phi}_{YY,m}(l,k), |Y_m(l,k)|^2\} - \hat{\Phi}'_{NN,m}(l,k)}{\hat{\Phi}'_{NN,m}(l,k)}. \quad (5)$$

Using the overestimation factor $\gamma_{SNR}$ the considered noise PSD results in $$\hat{\Phi}'_{NN,m}(l,k)=\gamma_{SNR}\cdot\hat{\Phi}_{NN,m}(l,k) \quad (6)$$

Based on Equation (4), the power ratios are evaluated by observing how many positive (+) or negative (−) values occur in each frame. Hence, for the positive counter follows:

$$c_m^+(l) = \sum_{k=0}^{K/2} c_m^+(l,k), \quad (7)$$

with $$c_m^+(\ell, k) = \begin{cases} 1, & \text{if } \hat{SPR}_m(\ell, k) > 0, \\ 0, & \text{else.} \end{cases} \quad (8)$$

Equivalently the negative counter can be determined by $$c_m^-(\ell) = \sum_{k=0}^{K/2} c_m^-(\ell, k), \quad (9)$$

considering $$c_m^-(\ell, k) = \begin{cases} 1, & \text{if } \hat{SPR}_m(\ell, k) < 0, \\ 0, & \text{else.} \end{cases} \quad (10)$$

Regarding these quantities, a soft frame-based SAD measure may be written by $$\chi_m^{SAD}(\ell) = G_m^c(\ell) \cdot \frac{c_m^-(\ell) - c_m^-(\ell)}{c_m^-(\ell) + c_m^-(\ell)}, \quad (11)$$

where $G_m^c(l)$ is an SNR-dependent soft weighting function to pay more attention to high SNR periods. In order to consider the SNR within certain frequency regions the weighting function is computed by applying maximum subgroup SNRs:

$$G_m^c(\ell) = \min\{\hat{\xi}_{max,m}^G(\ell)/10, 1\}. \quad (12)$$

The maximum SNR across K' different frequency subgroup SNRs $\hat{\xi}_m^G(l,æ)$ is given by $$\hat{\xi}_{max,m}^G(\ell) = \max_{æ \in \{1,...,K'\}} \{\hat{\xi}_m^G(\ell, æ)\}. \quad (13)$$

The grouped SNR values can each be computed in the range between certain DFT bins $k_æ$ and $k_{æ+1}$ with æ=1, 2, ..., K' and $\{k_æ\}=\{28, 53, 78, 103, 128, 153, 178, 203, 228, 253\}$. We write for the mean SNR in the æ-th subgroup:

$$\hat{\xi}_m^G(\ell, æ) = \frac{1}{k_{æ+1} - k_æ} \sum_{k=k_æ+1}^{k_{æ+1}} \hat{\xi}_m(\ell, k) \quad (14)$$

The basic fullband SAD is obtained by thresholding using $\Theta_{SAD1}$:

$$\tilde{SAD}_m(\ell) = \begin{cases} 1, & \text{if } \chi_m^{SAD}(\ell) > \Theta_{SAD1}, \\ 0, & \text{else.} \end{cases} \quad (15)$$

It is understood that during double-talk situations the evaluation of the signal power ratios is no longer reliable. Thus, regions of double-talk should be detected in order to reduce speaker activity misdetections. Considering the positive and negative counters, for example, a double-talk measure can be determined by evaluating whether $c_m^+(l)$ exceeds a limit $\Theta_{DTM}$ during periods of detected fullband speech activity in multiple channels.

To detect regions of double-talk this result is held for some frames in each channel. In general, double-talk $\widehat{DTD}(l)=1$ is detected if the measure is true for more than one channel. Preferred parameter settings for the realization of the basic fullband SAD can be found in Table 1 below.

TABLE 1

| Parameter settings for exemplary implementation of the basic fullband SAD algorithm (for M = 4) | | |
|---|---|---|
| $\Theta_{SNR1}$ = 0.25 | $\gamma_{SNR}$ = 4 | K' = 10 |
| $\Theta_{SAD1}$ = 0.0025 | $\Theta_{DTM}$ = 30 | |

Figure 5:
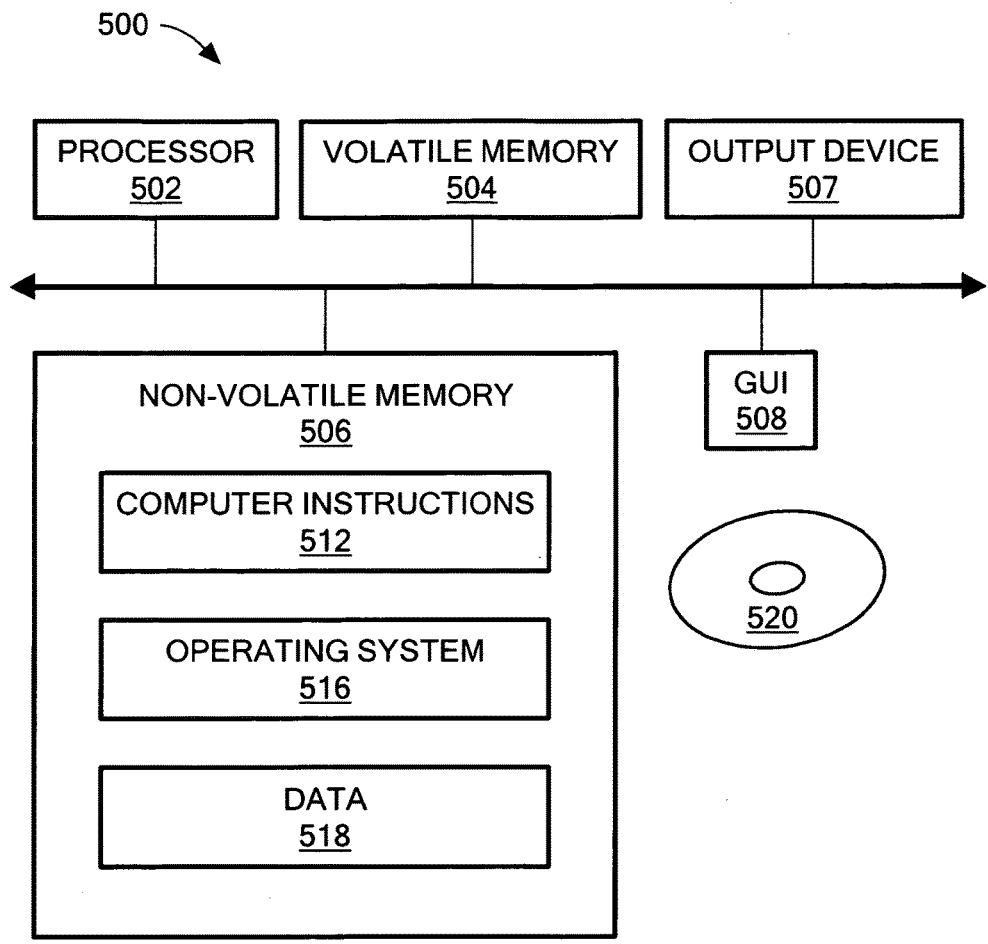
FIG. 5 is a schematic representation of an illustrative computer that can perform at least a portion of the processing described herein.

FIG. 5 shows an exemplary computer 500 that can perform at least part of the processing described herein. The computer 500 includes a processor 502, a volatile memory 504, a non-volatile memory 506 (e.g., hard disk), an output device 507 and a graphical user interface (GUI) 508 (e.g., a mouse, a keyboard, a display, for example). The non-volatile memory 506 stores computer instructions 512, an operating system 516 and data 518. In one example, the computer instructions 512 are executed by the processor 502 out of volatile memory 504. In one embodiment, an article 520 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed claims. All publications and references cited herein are expressly incorporated herein by reference in their entirety.

The invention claimed is:

1. A method of performing automated speech recognition (ASR) in a system having a speech enhancement module for generating an audio stream signal and metadata, coupled to an ASR module for performing speech recognition on the audio stream signal using the metadata, the method comprising:
 by the speech enhancement module, processing microphone signals to generate the audio stream signal;
 by a first speech detector having a first response latency, generating first metadata that indicate the possible presence of speech in the audio stream signal with a first confidence level;
 by a second speech detector having a second response latency that is higher than the first response latency, generating second metadata that indicate the possible presence of speech in the audio stream signal with a second confidence level that is higher than the first confidence level;
 by the ASR module based on the first metadata, initiating buffering of the audio stream signal from an endpoint; and
 by the ASR module based on the second metadata, initiating speech recognition on the buffered audio stream signal from the endpoint.

2. The method according to claim 1, wherein the first metadata has a frame-by-frame time scale.

3. The method according to claim 1, wherein the second metadata has a sequence of frames time scale.

4. The method according to claim 1, further including performing one or more of barge-in, beamforming, and/or echo cancellation for generating the first and/or second metadata.

5. The method according to claim 1, further including tuning a speech detection threshold for a given latency for the first metadata.

6. The method according to claim 1, further including adjusting latency for a given confidence level of voice activity detection for the second metadata.

7. The method according to claim 1, further including controlling computation of the second metadata using the first metadata or computation of the first metadata using the second metadata.

8. The method according to claim 1, further including performing one or more of barge-in, beamforming, and/or echo cancellation for generating further metadata.

9. The method according to claim 1, wherein at least one of the first and second metadata is encoded into the audio signal.

10. An article, comprising a non-transitory computer readable medium having stored instructions that when executed perform a method of automated speech recognition (ASR) in a system having a speech enhancement module for generating an audio stream signal and metadata, coupled to an ASR module for performing speech recognition on the audio stream signal using the metadata, the method comprising:
 by the speech enhancement module, processing microphone signals to generate the audio stream signal;
 by a first speech detector having a first response latency, generating first metadata that indicate the possible presence of speech in the audio stream signal with a first confidence level;
 by a second speech detector having a second response latency that is higher than the first response latency, generating second metadata that indicate the possible presence of speech in the audio stream signal with a second confidence level that is higher than the first confidence level;
 by the ASR module based on the first metadata, initiating buffering of the audio stream signal from an endpoint; and
 by the ASR module based on the second metadata, initiating speech recognition on the buffered audio stream signal from the endpoint.

11. The article according to claim 10, wherein the first metadata has a frame-by-frame time scale.

12. The article according to claim 10, wherein the second metadata has a sequence of frames time scale.

13. The article according to claim 10, further including instructions to perform one or more of barge-in, beamforming, and/or echo cancellation for generating the first and second metadata.

14. The article according to claim 10, further including instructions to tune speech detector parameters for a given latency for the first metadata.

15. The article according to claim 10, further including instructions to adjust latency for a given confidence level of voice activity detection for the second metadata.

16. The article according to claim 10, further including instructions to control computation of the second metadata using the first metadata or computation of the first metadata using the second metadata.

17. The article according to claim 10, further including instructions to perform one or more of barge-in, beamforming, and/or echo cancellation for generating further metadata.

18. A system for performing automated speech recognition (ASR) comprising a speech enhancement module for generating an audio stream signal and metadata, coupled to an ASR module for performing speech recognition on the audio stream signal using the metadata, the system further comprising:
 in the speech enhancement module, electronic circuitry configured to provide:
  a first speech detector having a first response latency for generating first metadata that indicate the possible presence of speech in the audio stream signal with a first confidence level; and
  a second speech detector having a second response latency that is higher than the first response latency for generating second metadata that indicate the possible presence of speech in the audio stream signal with a second confidence level that is higher than the first confidence level; and
 in the ASR module, electronic circuitry configured to provide:
  an endpointing module for initiating, based on the first metadata, buffering of the audio stream signal from an endpoint, and for initiating, based on the second metadata, speech recognition on the buffered audio stream signal from the endpoint.

19. The system according to claim 18, further including a further speech detector to perform one or more of barge-in, beamforming, and/or echo cancellation for generating further metadata for use by the endpointing module.

20. The system according to claim 18, wherein the first speech detector is further configured to tune detector parameters for a given latency for the first metadata.

21. The system according to claim 18, wherein the second speech detector is further configured to adjust latency for a given confidence level of voice activity detection using the second metadata.

* * * * *